United States Patent Office 2,840,444
Patented June 24, 1958

2,840,444
PROCESS FOR THE PRODUCTION OF COMPLEX COPPER COMPOUNDS OF DIRECT-DYEING DYESTUFFS ON THE FIBER

Emil Kraehenbuehl, Basel, Switzerland, assignor to Ciba Limited, Basel, Switzerland No Drawing. Application October 4, 1954
Serial No. 460,260

Claims priority, application Switzerland October 13, 1953

3 Claims. (Cl. 8—72)

It is known that the properties of certain direct-dyeing dyestuffs, that is to say, dyestuffs which are absorbed substantively by cellulose fibers without the aid of mordants, can be improved by treatment on the fiber with an agent yielding copper. A great many dyestuffs are known, which, by virtue of their constitution, are capable of forming complex copper compounds, and among these dyestuffs there are especially important those which in the metal-free condition (that is to say, containing no heavy metal bound in complex union) possess a useful solubility in water, but of which the complex copper compounds are sparingly soluble or insoluble in water. With such dyestuffs there are often obtained, after conversion on the fiber into the corresponding complex copper compounds, dyeings having especially valuable properties of fastness. Processes for dyeing with such dyestuffs are known in which there are carried out in one and the same bath first dyeing and then, advantageously after extensive exhaustion of the bath, after-coppering on the fiber. For this purpose there are advantageously used complex copper compounds, for example, complex sodium copper tartrate.

The present invention is based on the observation that the production of complex copper compounds of direct-dyeing metallizable dyestuffs on the fiber can be carried out with advantage by using cuprous thiocyanate as the agent yielding copper.

The copper thiocyanate can be prepared most simply by the reaction of a soluble cupric salt with an alkali thiocyanate. When suitably prepared it is obtained directly in a rather finely powdered form. After being filtered off, it is advantageously used in the form of an aqueous paste of known strength for the purposes of the present invention.

The treatment of the dyeings produced with direct-dyeing metallizable dyestuffs with copper thiocyanate may, if desired, be carried out in a fresh bath. It is, however, possible to carry out this treatment in the dyebath itself, especially after the bath has been extensively exhausted. It is unnecessary to neutralize any alkaline reaction of the bath used. If desired, the reaction may be carried out in a neutral to acid medium.

For conversion into the corresponding complex copper compounds there are suitable in the present process all those dyestuffs which are capable of forming metal complexes which are in some degree stable. However, there are used with advantage those dyestuffs which can be used in the metal-free condition in the usual manner for dyeing, and whose complex copper compounds are sparingly soluble to insoluble and serve for producing relatively fast dyeings.

As metallizable dyestuffs there also come into consideration those direct-dyeing dyestuffs which contain no groups capable of forming metal complexes, but which usually undergo an improvement in fastness properties when treated on the fiber with agents yielding copper. Good results can also be obtained by the present process with some dyestuffs which already contain copper bound in complex union and which in the form of copper complexes are sufficiently soluble in water to be used for dyeing according to the usual direct dyeing methods.

The present process is especially important for producing prints with metallizable direct-dyeing dyestuffs. It is known to print on cellulose fabrics copper-free substantive dyestuffs which are capable of forming copper complexes with the addition of a solution promoter (caustic soda solution, urea), an electrolyte not having a salting out action ($Na_2HPO_4$) and, if desired, a mild oxidizing agent (sodium nitrobenzene sulfonate) and a thickening, then to fix the dyestuff on the fiber my steaming, and, with or without intermediate rinsing, to render the print fast to washing by after-treatment with a soluble copper salt with or without the addition of a cation-active amine-formaldehyde condensation product.

The latter process has found rather wide application and has been used in many cases instead of the former customary printing process with chrome mordant dyestuffs, but it has the great disadvantage that after steaming, treatment in a bath containing a copper salt is necessary, and this not only involves the risk of staining to a greater or less extent the white ground by the copper salt, but, what is still more undesirable, certain colors which are sensitive to copper undergo a change in shade and their properties of fastness are affected.

Various attempts have been made to incorporate a copper compound with printing colors containing a dyestuff capable of being coppered, in order to avoid the subsequent after-treatment. It has been found that the copper compounds hitherto proposed for this purpose are much too soluble and consequently form in the printing color at least partially the insoluble dyestuff-copper complex which can be fixed on the fiber only to a very small extent. Consequently as compared with the method of after-treating the prints, printing colors made up in this manner give a markedly lower yield and have a poor stability.

It has been found that cuprous thiocyanate, which is very sparingly soluble, is suitable as an addition to printing colors containing direct dyestuffs capable of being coppered. Thus, printing compositions which contain a metallizable direct-dyeing dyestuff and also cuprous thiocyanate possess a good stability without the complex copper compound of the metallizable dyestuff being formed. Such printing pastes may contain the usual thickening agents customary in printing with direct-dyeing dyestuffs, such as vegetable mucilages, starches, salts of cellulose-glycollic acid and the like. In many cases it is of advantage to add a substance capable of promoting solubility such as thiodiglycol or another polyhydric alcohol. The printing compositions may, if desired, also contain substances of alkaline reaction such as sodium hydroxide, sodium-carbonate, potassium carbonate, secondary or tertiary phosphates, disodium phosphate, trisodium phosphate, sodium pyrophosphate or sodium polyphosphates, if such substances are necessary or desirable for dissolving the dyestuff. In such cases it may, however, be of advantage to reduce the strongly alkaline reaction by the addition of a buffer substance, for example, an acid phosphate, or even to adjust the pH to a lower value by the addition of a suitable acid (acetic acid, formic acid or phosphoric acid).

Although, as already stated, such printing compositions are surprisingly stable at normal room temperatures up to 30° C., there occur, at a raised temperature, for example above 80° C. but particularly under steaming conditions, on the one hand, fixation of the dyestuff on the fiber, and, on the other, the formation of the copper complex, so that the print generally has the fastness of an after-coppered dyeing produced with the same dyestuffs. It is possible to add a weak oxidizing agent to the printing composition, for example, sodium 3-nitrobenzene-1-sulfonate, but, surprisingly, this is not necessary notwithstanding that the copper in the cuprous thiocyanate is present in monovalent form.

It is frequently of advantage to add a hydrotropic agent, which accelerates fixation of the dyestuff on the fiber, for example, thiodiglycol, which has been mentioned above, or another glycol derivative, but more especially urea. This expedient accelerates the fixation of the dyestuff on the fiber, which in some cases would otherwise be insufficiently rapid. In some cases the properties of wet fastness of the prints can be still further improved by after treatment of the finished print with a cation-active amine-formaldehyde condensation product.

The present process may also be combined in a suitable manner with another dyeing or printing process, especially in producing prints of which the patterns are separate from one another. Thus, for example, cellulose-containing fabrics can be printed in one operation, advantageously in a roller printing machine having two or more printing rollers, a part of which carry a printing composition in accordance with the present invention, and another part a printing composition of a different kind, and the printed material finished in a suitable manner. Valuable results are obtained, for example, by first impregnating the material to be printed with suitable coupling components free from water solubilizing groups (so-called naphthols, especially 2-hydroxynaphthalene-3-carboxylic acid arylamides), and then printing, on the one hand, with a printing paste containing a direct-dyeing metallizable dyestuff in accordance with the present process and, on the other, with a so-called base printing composition viz. a printing composition containing a diazo compound suitable for the production of ice colors. As is known, these dyestuffs produced, for example, directly on the fiber in base printing are distinguished by very good properties of wet fastness. Moreover, these two classes of dyestuffs extend the range of tints available in an advantageous manner, so that their joint use in the manner described above leads to a valuable enrichment of the possibilities hitherto available for producing prints having good properties of wet fastness.

By the present process not only prints, but, as stated above, also dyeings can be produced.

Thus, for example, particularly valuable results are obtained by impregnating cellulosic fibers on a foulard with cold dyeing liquids containing the dissolved metal-lizable dyestuff and the copper thiocyanate in suspension and then steaming the impregnated fiber with or without intermediate drying. On the fibers thus dyed prints can be produced with the aid of similar dyestuffs or discharge printing with the ordinary reductive discharge paste after steaming. The use of cold foulard dyebaths is of particular advantage in that the rate of absorption of most dyebaths is greatly reduced, which results in obtaining more easily dyeings which are uniform from end to end when combining several dyestuffs, and keeping a shade invariable through a whole dyeing batch with less difficulty.

The following examples illustrate the invention, the parts and percentages being by weight:

Example 1

Printing compositions are prepared in accordance with the recipes I to IV, and each of them is used for printing a fabric of cotton, or artificial silk or staple fibers of regenerated cellulose.

|  | I | II | III | IV |
|---|---|---|---|---|
|  | Parts | Parts | Parts | Parts |
| Dyestuff | 13 | 25 | 13 | 26 |
| Urea | 150 | 150 | 150 | 150 |
| Water | 282 | 224 | 205 | 433.5 |
| Sodium hydroxide solution of 30% strength |  | 5 | 10 | 2.5 |
| Tragacanth mucilage of 6% strength (neutralized with sodium hydroxide) | 500 | 500 | 525 | 350 |
| Monoammonium phosphate |  | 6 | 12 | 3 |
| Cuprous thiocyanate paste of 50% strength | 35 | 40 | 35 | 35 |
| Thiodiglycol |  | 50 | 50 |  |
| Disodium phosphate | 20 |  |  |  |
|  | 1,000 | 1,000 | 1,000 | 1,000 |

For preparing the above printing compositions the following dyestuffs are used:

*Printing composition I.*—The dyesuff of the formula

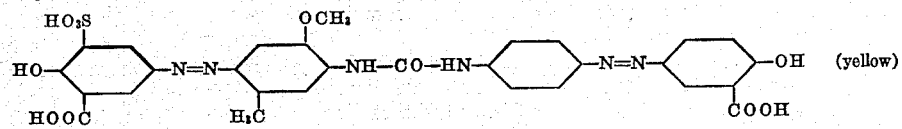 (yellow)

*Printing composition II.*—The dyesuff of the formula

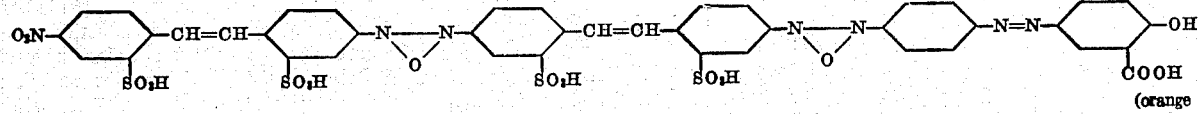 (orange)

*Printing composition III.*—The dyestuff of the formula

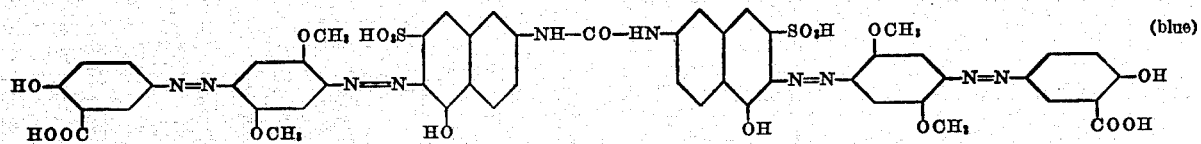 (blue)

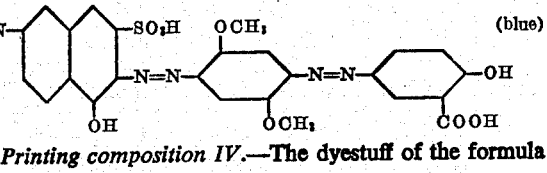

*Printing composition IV.*—The dyestuff of the formula

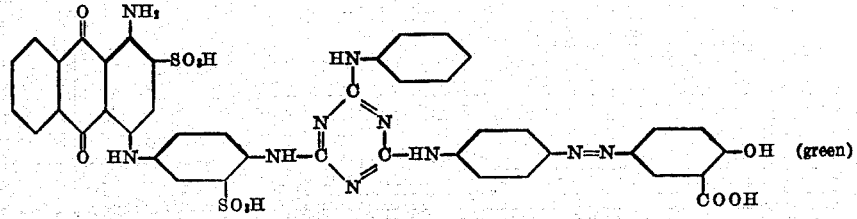 (green)

The prints are dried, steamed twice for 8 minutes in a Mather-Platt apparatus, rinsed for 10 minutes in running water, soaped for 5 minutes at 40° C. with a solution which contains 5 grams of soap and 2 grams of anhydrous sodium carbonate in 1 liter of water, again rinsed and dried.

The more strict requirements with regard to fastness to washing which are not sufficient in the case of prints obtained with printing composition IV can be met by substantially improving the fastness to washing by an after-treatment, following the first rinsing, with a cation-active amine-formaldehyde condensation product at room temperature. In the other cases the fastness to washing is also markedly improved by such an after-treatment, and it is generally recommended in the case of dark tints.

Example 2

Printing compositions are prepared in accordance with the recipes I to III given in the following table. A cotton fabric is impregnated with an alkaline solution which contains 12 grams of 2-hydroxynaphthalene-3-carboxylic acid phenylamide in 1 liter of water and then dried. The impregnated fabric is then printed with two rollers one of which applies one of the printing compositions I to III and the other of which applies a printing paste prepared in the usual manner and containing diazotized 1-amino-2:5-dichlorobenzene or diazotized 1-amino-2-methoxy-5-chlorobenzene, the two rollers printing separate patterns on the fabric.

|  | I | II | III |
| --- | --- | --- | --- |
|  | Parts | Parts | Parts |
| Dyestuff | 9 | 13 | 20 |
| Urea | 150 | 150 | 150 |
| Water | 202 | 195 | 274 |
| Sodium hydroxide solution of 30% strength | 20 | 10 | 5 |
| Tragacanth mucilage of 6% strength (neutralized with sodium hydroxide) | 550 | 525 | 500 |
| Monoammonium phosphate | 24 | 12 | 6 |
| Cuprous thiocyanate paste of 50% strength | 35 | 35 | 35 |
| Thiodiglycol |  | 50 |  |
| Formic acid of 85% strength | 10 | 10 | 10 |
|  | 1,000 | 1,000 | 1,000 |

The following dyestuffs are used for preparing the printing compositions I to III:

*Printing composition I.*—The dyestuff of the formula

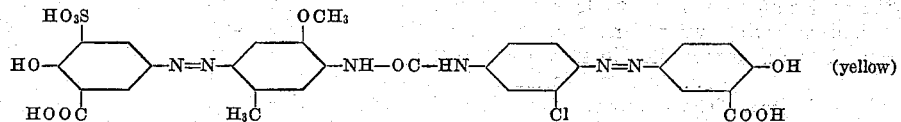 (yellow)

*Printing composition II.*—The dyestuff of the formula

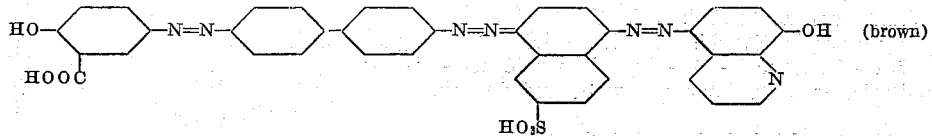 (brown)

*Printing composition III.*—The dyestuff of the formula

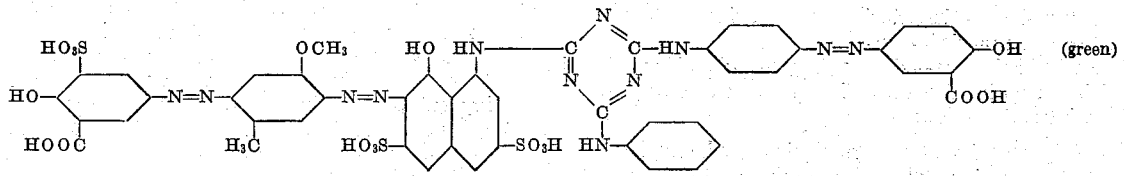 (green)

The prints are dried, steamed twice for 8 minutes in a Mather-Platt apparatus, soaped for 5 minutes at 90° C. with a solution which contains, in 1 liter of water, 5 grams of soap and 2 grams of anhydrous sodium carbonate, rinsed in the cold and dried. There are obtained in this manner 2-color prints which are fast to washing, the fabric being printed, on the one hand, the tint of one of the above dyestuffs and, on the other, a scarlet tint with the use of diazotized 1-amino-2:5-dichlorobenzene and a red tint with the use of diazotized 1-amino-2-methoxy-5-chlorobenzene.

Example 3

A dyebath is prepared from 4000 parts of water, 2 parts of sodium carbonate, 30 parts of crystalline sodium sulfate and also 1.2 parts of one of the dyestuffs used for preparing the printing compositions I, II and III in Example 2, and 100 parts of cotton are entered at 40° C. The temperature is raised to 95° C., and dyeing is carried on for 1½ hours at that temperature. The dyebath is then cooled to 70° C., and there is then added 0.8 part of cuprous thiocyanate in the form of a paste of 5% strength. The temperature is slowly raised to 90° C., and the bath is maintained for ¼ hour at that temperature. The dyeing is then rinsed and finished in the usual manner.

Example 4

For preparing the dyebath one of the following dyestuffs is used:

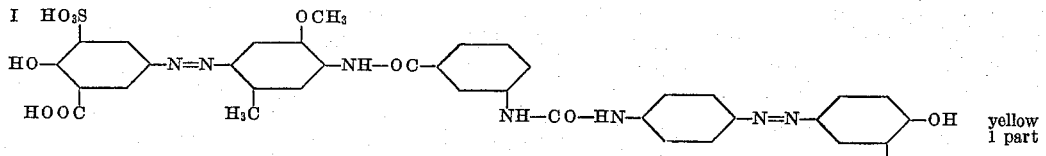 yellow 1 part

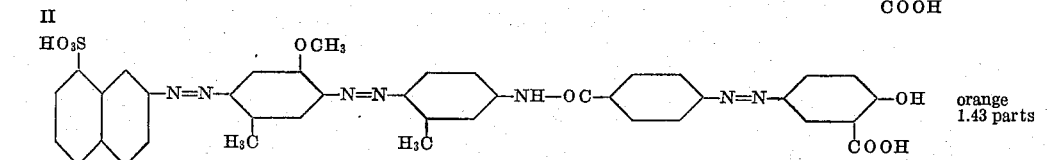 orange 1.43 parts

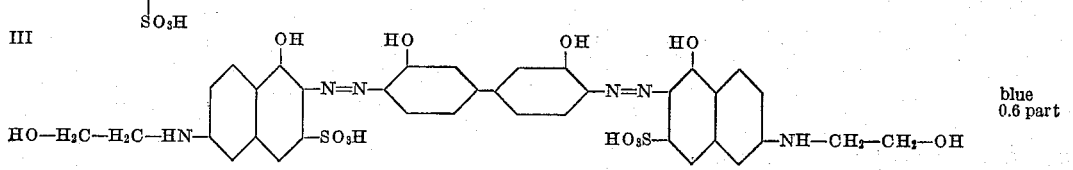 blue 0.6 part

The given quantity of dyestuff is dissolved in 1000 parts of boiling water and the solution then cooled to 10–15° C. 5 parts of cuprous thiocyanate are added to the cold solution and the whole is well mixed. Then on a foulard having two rollers, a cotton, cellulosic or viscose fabric is impregnated in such a way that the fabric absorbs 90 percent of the liquid (calculated on the weight of the fabric). The impregnated fabric is then treated according to one of the following methods:

(a) The fabric is steamed for 8 minutes in a Mather-Platt apparatus at about 105° C., then washed for half an hour at 50° C. with a solution which contains 5 parts of $\mu$ - heptadecyl - N - benzylbenzimidazol - sodium-disulfonate in 1000 parts of water and then rinsed and dried.

(b) The fabric is first dried, then steamed for 8 minutes in a Mather-Platt apparatus at about 105° C. and then washed as described under (a), rinsed and dried.

(c) The fabric is dried.

After being treated according to (a), (b) or (c) the fabric is printed with a discharge paste having the following composition:

150 parts of sodium formaldehyde sulphoxylate
400 parts of crystal gum thickening
100 parts of calcium salt of disulphonic acid of dimethylphenyl-benzyl-ammonium chloride
170 parts of water
100 parts of potassium carbonate
50 parts of glycerine
30 parts of an aqueous suspension of anthraquinone of 30 percent strength 1000 parts After printing, the fabric is dried, steamed for 8 minutes in a Mather-Platt apparatus, rinsed for 15 minutes with cold water, after-treated for 10 minutes in a bath containing 5 parts by volume of concentrated ammonia in 1000 parts of water, rinsed cold, soaped at 40° C. in a solution containing 3 parts of soap and 1 part of anhydrous sodium carbonate in 1000 parts of water, rinsed cold once more and finally dried. Depending on the choice of dyestuff (see above) there are obtained white prints of good fastness to washing on a yellow, orange or blue ground.

According to methods in themselves known colored discharge prints can be produced in the same way by using dyestuffs to hydrosulfite and/or white discharge effects can be combined with prints (without discharging the pad dyeing).

What is claimed is:

1. A process for producing complex copper compounds of direct-dyeing metallizable azo dyestuffs on the fiber, which comprises printing cellulosic fibers with a printing paste containing a direct-dyeing metallizable azo dyestuff of which the complex copper compound is sparingly soluble to insoluble in water and containing cuprous thiocyanate.

2. A process for producing complex copper compounds of direct-dyeing metallizable azo dyestuffs on the fiber, which comprises printing cellulosic fibers, which have been impregnated with a coupling component free from water-solubilizing groups, on the one hand with a printing paste containing a diazo compound suitable for the production of ice colors, and on the other hand with a printing paste containing a direct-dyeing metallizable azo dyestuff of which the complex copper compound is sparingly soluble to insoluble in water and containing cuprous thiocyanate.

3. A printing paste for producing complex copper compounds of direct-dyeing metallizable azo dyestuffs on cellulose fibers, which paste contains a direct-dyeing metallizable azo dyestuff, of which the complex copper compound is sparingly soluble to insoluble in water, and also contains cuprous thiocyanate.

References Cited in the file of this patent

UNITED STATES PATENTS 2,148,659   Straub _____ Feb. 28, 1939

OTHER REFERENCES

"Principles and Practice of Textile Printing" by Knecht and Fothergill, 3rd ed., 1936, published London by Charles Griffin & Co., pp. 237, 238.

UNITED STATES PATENT OFFICE
CERTIFICATE OF CORRECTION

Patent No. 2,840,444                                                      June 24, 1958

Emil Kraehenbuehl

It is hereby certified that error appears in the printed specification of the above numbered patent requiring correction and that the said Letters Patent should read as corrected below.

Column 2, line 12, for "my" read -- by --; column 8, line 6, after "dyestuffs" insert -- fast --.

Signed and sealed this 9th day of December 1958.

(SEAL)
Attest:

KARL H. AXLINE                                              ROBERT C. WATSON

Attesting Officer                                            Commissioner of Patents